June 21, 1955    A. M. JOHNSON, JR    2,711,200
FRUIT CUTTING DEVICE
Filed Oct. 9, 1952    2 Sheets-Sheet 1
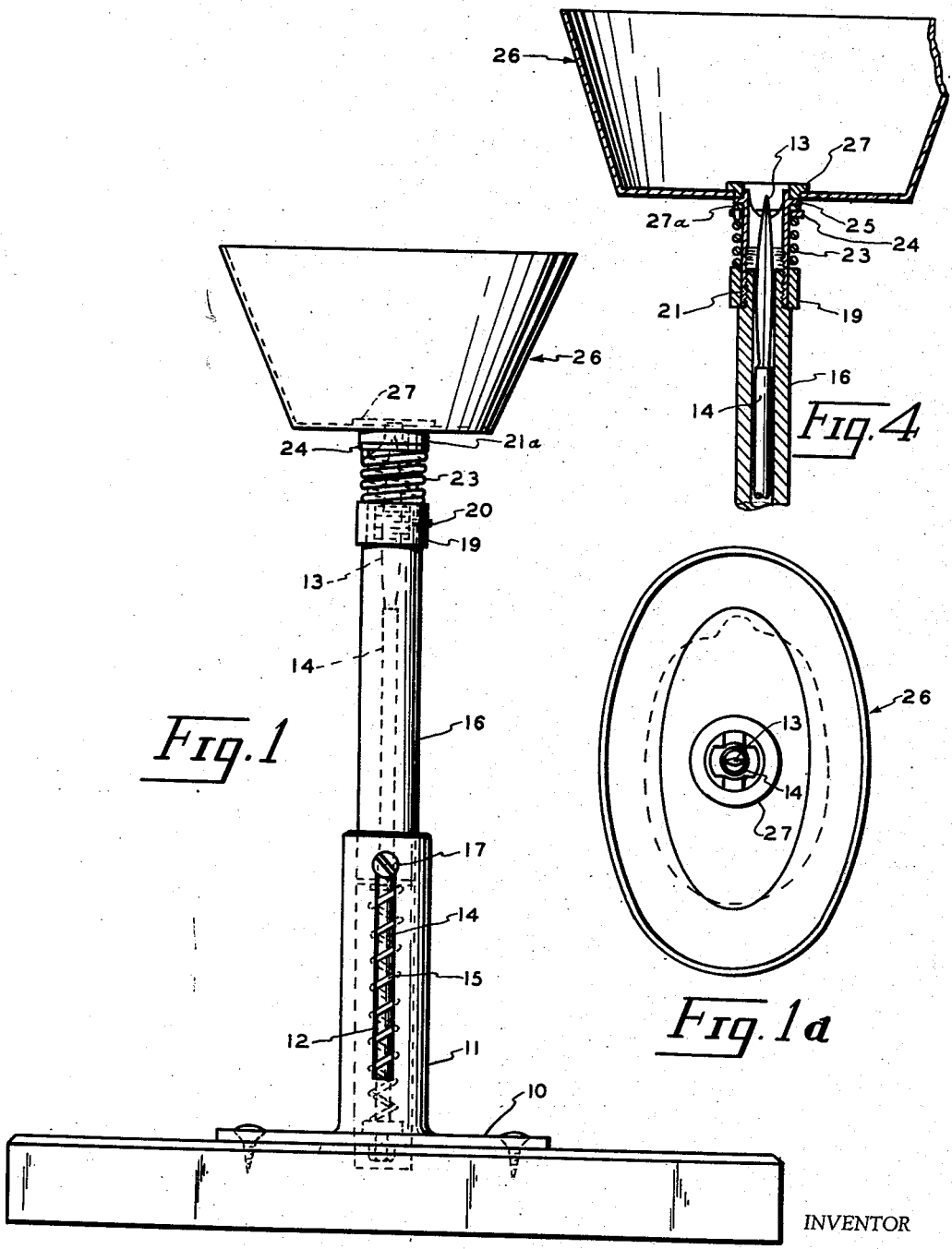
INVENTOR
ARTHUR M. JOHNSON JR.
BY
ATTORNEY

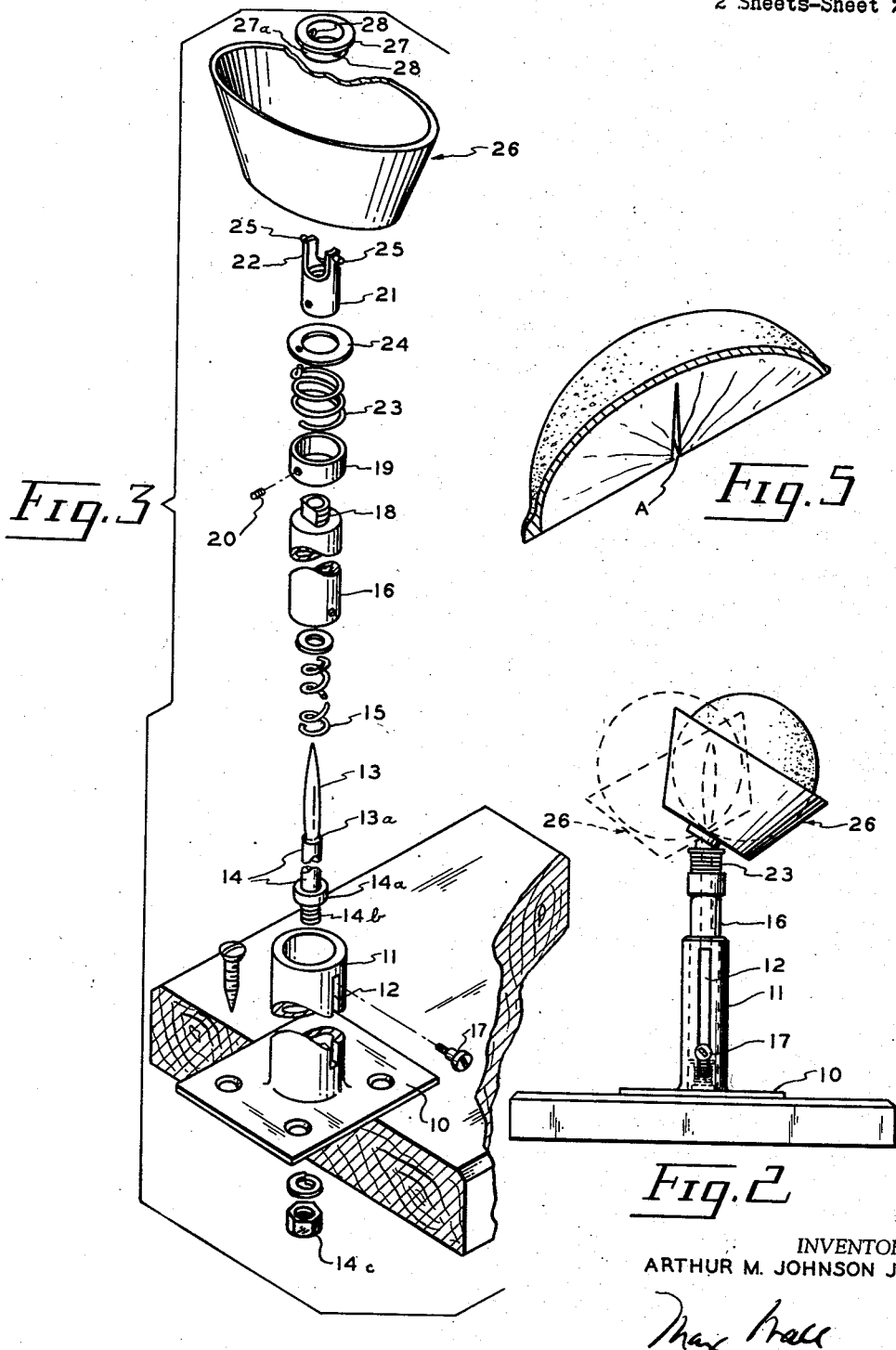

United States Patent Office 2,711,200
Patented June 21, 1955

2,711,200

FRUIT CUTTING DEVICE

Arthur M. Johnson, Jr., Greensboro, N. C.

Application October 9, 1952, Serial No. 313,850

3 Claims. (Cl. 146—3)

This invention relates to a simple device for cutting the membrane, or central vascular bundle of a whole citrus fruit, such as a lemon, prior to cutting same into sections for serving with beverages, and the cutting operation also cuts the fruit pulp portions transversely so that the sections or wedges may be seated on the edge of a container, such as a glass or tumbler, when it is served. This saves the time and effort involved in making the transverse cut on each segment or wedge of fruit after it has been sectionalized, as was heretofore the practice.

Use is made of a simple machine for this purpose, easily operated and economically made. For a more complete description of the invention, reference is made to the accompanying drawings and specification, wherein the invention is illustrated and more fully described.

In the drawings,

Figure 1 is a front elevation.

Figure 1a is a plan view of the cup with a citrus fruit in position.

Figure 2 is a side or end elevation of the device in use, showing the knife penetrating a lemon at one limit of its stroke.

Figure 3 is an exploded view of the parts.

Figure 4 is an enlarged detail.

Figure 5 is an elevation of a section or wedge of lemon after it has been cut transversely according to this teaching, and subsequently sectionalized.

The invention comprises a base 10 upon which a socket 11 is permanently fixed, the socket having a vertical slot 12 extending substantially the full length of the socket. A knife having a double edged blade 13 and a stem 14 is fixed concentrically within the socket, the stem being permanently affixed to the base 10 in any suitable manner. As shown, the stem has a collar 14a below which the stem is threaded at 14b, the threaded portion passing through an opening provided in the base 10, and being secured by a nut 14c.

A compression spring 15 is mounted over the stem 14 and rests on the collar 14a. A tubular standard 16 having a sliding fit within the socket 10 is disposed about the knife, rests on the upper end of spring 15, and is slidable telescopically within the socket. A screw 17, passing through the slot 12 and engaging the standard, retains said standard within the socket and limits its movement with respect to said socket.

The upper end of the standard is threaded at 18. A yoke, embodying a lower threaded, tubular portion 21 and upwardly extending arms 22, is threaded over the stem 18. A collar 19 surrounds the tubular portion of the yoke and is seated upon the upper end of the standard 16. A compression spring 23 surrounds the tubular portion and is seated on the upper edge of said collar. The upper end of the spring bears against a washer 24, which is held in position by a pair of vertically extending arms 22, each having a short trunnion 25 extending therefrom. The trunnions limit upward movement of the washer 24 and permit it to pivot around them, as will hereinafter appear.

A lemon receptacle 26 is provided having a bottom and outwardly flared wall, the bottom having a substantially centrally disposed opening. A flanged collar 27 is permanently fixed to this opening, the collar portion 27a extending downwardly below the bottom of the receptacle. Holes forming bearings 28 are provided on opposite sides of the collar 27a to receive the trunnions 25 of the yoke member.

When the receptacle 26 is seated on the yoke, the lower edge of the collar 27a rests on the washer 23. It will be obvious from this construction that the receptacle 26 can be rocked from side to side on the trunnions 25 against the action of the spring 23, which normally holds the receptacle in a level position when it is at rest. It is important that the blade be positioned at right angles to the pivotal axis of the receptacle, so that it is always rocked towards or away from the edges of the blade.

It will be clear from the foregoing description that by placing a lemon in the receptacle and pressing down upon it by hand, the receptacle and standard 16 will be moved downwardly against the action of spring 15, and the knife 13 will project upwardly through the collar 27 into the fruit in the receptacle. The combined length of the knife and stem is predetermined so as not to exceed the height of the receptacle when it is depressed to its lowermost position, and preferably, the point of the knife should extend to a distance slightly below the upper edge of the receptacle when it is at its lowermost position.

With the receptacle and lemon thus lowered, the knife penetrates substantially along the minor axis of the fruit, and as the receptacle is rocked from side to side on its trunnions 25, the knife will cut the fruit transversely in an arc described about the hilt of the knife with the blade as a radius. Thus, the central vascular bundle of the fruit will be cut transversely, together with the pulpy meat portions immediately adjoining it, so that when the lemon is subsequently sectionalized, each section or wedge will be pre-cut transversely as shown at A in Figure 5, by means of which it may be positioned over the edge of a container, usually a glass or tumbler, in which beverages are served.

While reference has been made to a lemon, it will be obvious that other fruits or objects may be handled in like manner, and the reference to the particular fruit is merely for the purpose of illustration and not limitation.

The device is preferably made of metal which is resistant to the acids of fruits, especially citrus fruits, and stainless steel is ideally suited for this purpose, but other metals or materials having acid resistant properties may be used.

I claim:

1. A cutting device comprising a base, a knife fixed to said base and extending outwardly thereof, telescopic sections disposed about said knife and supported on said base, means within one of said sections urging the other section outwardly of said base, means engaging said sections for limiting the outward movement of said other section, a yoke mounted on said last named section, a receptacle pivotally and yieldably supported on said yoke, said receptacle having an opening therein to receive said knife, said knife extending into said receptacle when the telescopic sections are closed, said receptacle being movable on said sections over said knife and being yieldingly rockable in the direction of the cutting edge thereof.

2. A cutting device comprising a base, a knife fixed to said base and extending outwardly thereof, telescopic sections disposed about said knife and supported on said base, means within one of said sections urging the other section outwardly of said base, means engaging said sections for limiting the outward movement of said other section, a yoke mounted on said last named section, trunnions carried by said yoke, a receptacle pivotally and yieldably supported on said trunnions, said knife extending into said receptacle when the telescopic sections are closed, said receptacle having an opening therein to receive said knife, said receptacle being movable on said sections over said knife and being yieldably rockable in the direction of the cutting edge thereof.

3. A cutting device comprising a base, a knife fixed to said base and extending outwardly thereof, telescopic sections disposed about said knife and supported on said base, means within one of said sections urging the other section outwardly of said base, means engaging said sections for limiting the outward movement of said other section, a yoke mounted on said last named section, trunnions carried by said yoke, a receptacle having an opening in the bottom thereof and a collar seated in said opening, said collar having bearings for supporting said trunnions, said receptacle being pivotally and yieldably supported on said trunnions, said knife extending through said collar into said receptacle when the latter is moved on said sections towards said base, said receptacle being pivotable towards the cutting edge of the knife.

References Cited in the file of this patent

UNITED STATES PATENTS

| | | |
|---|---|---|
| 831,313 | Thomas | Sept. 18, 1906 |
| 2,224,941 | Weimer | Dec. 17, 1940 |
| 2,512,921 | Dougherty | June 27, 1950 |

FOREIGN PATENTS

| | | |
|---|---|---|
| 452,529 | Germany | Nov. 14, 1927 |